United States Patent [19]
Gorgerin

[11] Patent Number: 5,637,634
[45] Date of Patent: Jun. 10, 1997

[54] COMPOSITION BASED ON AN OLEFIN POLYMER AND OBJECT MANUFACTURED FROM THIS COMPOSITION

[75] Inventor: Michel Gorgerin, Jurbise, Belgium

[73] Assignee: Solvay (Société Anonyme), Brussels, Belgium

[21] Appl. No.: 565,905

[22] Filed: Dec. 1, 1995

Related U.S. Application Data

[63] Continuation of Ser. No. 262,250, Jun. 20, 1994, abandoned.

[30] Foreign Application Priority Data

Jun. 24, 1993 [BE] Belgium ............................ 09300654

[51] Int. Cl.$^6$ ..................................................... C08K 5/24
[52] U.S. Cl. ...................... 524/262; 524/265; 524/269; 524/581; 525/479
[58] Field of Search ................................. 524/262, 265, 524/269, 581; 525/479

[56] References Cited

U.S. PATENT DOCUMENTS

| | | | |
|---|---|---|---|
| 4,535,113 | 8/1985 | Foster et al. | 524/262 |
| 5,206,075 | 4/1993 | Hodgson, Jr. | 525/240 |

FOREIGN PATENT DOCUMENTS

| | | |
|---|---|---|
| 0004647 | 10/1979 | European Pat. Off. . |
| 0158140 | 10/1985 | European Pat. Off. . |

*Primary Examiner*—Mark D. Sweet
*Attorney, Agent, or Firm*—Spencer & Frank

[57] ABSTRACT

Composition including a silicone and an olefin polymer, the olefin polymer exhibiting a molecular mass distribution defined by an $M_w/M_n$ ratio not exceeding 12.

Object manufactured from such a composition.

11 Claims, No Drawings

COMPOSITION BASED ON AN OLEFIN POLYMER AND OBJECT MANUFACTURED FROM THIS COMPOSITION

This application is a continuation of application Ser. No. 08/262,250, filed Jun. 20, 1994, now abandoned.

FIELD OF THE INVENTION

The present invention relates to a composition based on an olefin polymer, in particular such a composition additionally including a silicone. It also relates to objects manufactured from this composition.

TECHNOLOGY REVIEW

To facilitate the processing of olefin polymers such as polypropylene or polyethylene it is generally known to incorporate therein one or more additives such as a fluoropolymer (for example polyvinylidene fluoride), or a silicone. To this end it has already been proposed in Patent EP-0,158,140 to prepare films by extrusion from an olefin polymer to which a silicone has been added; the films thus obtained exhibit improved mechanical and optical properties.

It has now been found that some of these known compositions do not make it possible to manufacture objects which have a glossy surface.

SUMMARY OF THE INVENTION

The invention overcomes this disadvantage by providing a new composition exhibiting good processing properties and making it possible to manufacture glossy objects. Another objective of the present invention is to provide a composition which can be used for the manufacture of food packaging.

DETAILED DESCRIPTION OF THE INVENTION

Consequently, the present invention relates to a composition including at least one olefin polymer and at least one silicone, the olefin polymer exhibiting a molecular mass distribution defined by an $M_w/M_n$ ratio not exceeding 12.

The $M_w/M_n$ ratio denotes the ratio of the weight-average molecular mass ($M_w$) of the olefin polymer to the number-average molecular mass ($M_n$) of the olefin polymer.

The $M_w/M_n$ ratio is measured by steric exclusion chromatography performed in 1,2,4-trichlorobenzene at 135° C. on a Waters company model 150 C chromatograph.

The composition according to the invention includes at least one olefin polymer. The olefin polymer may be chosen from homopolymers derived from an olefin, which are obtained by any suitable known means. Polymers derived from olefins are preferably employed. Examples of olefins which can be employed in accordance with the invention are those containing up to 20 carbon atoms, advantageously from 2 to 12 carbon atoms per molecule, for example ethylene, propylene, 1-butene, 1-pentene, 3-methyl-1-butene, 1-hexene, 3- and 4-methyl-1-pentenes, 1-octene, 3-ethyl-1-butene, 1-heptene, 3,4-dimethyl-1-hexene, 4-butyl-1-octene, 5-ethyl-1-decene and 3,3-dimethyl-1 -butene. The preferred olefin polymers are polyethylene and polypropylene. It is obvious that the composition according to the invention may include a number of homopolymers simultaneously.

The olefin polymer of the composition according to the invention my also be a copolymer of an olefin as defined above with at least one olefinically unsaturated comonomer. Examples of olefinically unsaturated comonomers which can be employed in accordance with the invention are substituted or unsubstituted olefins containing up to 8 carbon atoms, such as 1-butene, 1-pentene, 3-methyl-1-butene, 1-hexene, 3- and 4-methyl-1 -pentenes and 1-octene and diolefins containing from 4 to 18 carbon atoms. The copolymers which are particularly recommended are those of ethylene and/or propylene. The comonomers of ethylene are in most cases chosen from propylene, 1-butene, 1-hexene and 1-octene. The preferred comonomers of propylene are ethylene, 1-butene, 1-hexene and 1-octene. The composition according to the invention may, of course, contain simultaneously a number of copolymers as defined above.

The olefin polymers which are particularly preferred are ethylene homopolymers and copolymers.

The composition according to the invention may also include simultaneously one or more homopolymers and one or more copolymers as described above.

The olefin polymers which have produced satisfactory results are those which exhibit a standard density of at least 0,920 g/cm$^3$, preferably of at least 0,930 g/cm$^3$; values lower than or equal to 0,970 g/cm$^3$, for example lower than or equal to 0,965 g/cm$^3$, being the most common ones. Values from 0,920 to 0,970 g/cm$^3$ are especially recommended. The preferred standard densities are from 0,935 to 0,955 g/cm$^3$.

The olefin polymers generally have a melt index, measured at 190° C. and a 2.16 kg load according to ASTM standard D 1238 (1986) of at least 0.05 g/10 min, in particular of at least 0.1 g/10 min, values of at least 0.2 g/10 min being the most advantageous ones. The melt index generally does not exceed 10 g/10 min and is more especially not more than 5 g/10 min, values of not more than 1 g/10 min (for example approximately 0.5 g/10 min) being recommended.

One of the essential characteristics of the present invention is the narrow nature of the molecular mass distribution of the olefin polymer, defined by an $M_w/M_n$ ratio lower than or equal to 12, preferably lower than or equal to 10; the $M_w/M_n$ ratio is generally higher than or equal to 3, values of at least 5 being the most common ones. $M_w/M_n$ ratios of approximately 8 are suitable.

The composition according to the invention additionally includes a silicone. The silicone which can be used may be chosen, for example, from macromolecules consisting of units of general formula:

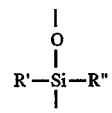

in which each of R' and R" denotes a hydrocarbon group which may be linear or cyclic, saturated or unsaturated, aromatic or aliphatic, unsubstituted or partially or completely substituted, and which may optionally include another element, such as oxygen or nitrogen. Hydrocarbon groups which are especially recommended are saturated linear aliphatic alkyls. Examples which may be mentioned are methyl, n-propyl, isopropyl, n-butyl, t-butyl, pentyl and hexyl. The macromolecules may, of course, consist of a number of different units. Typical examples of a silicone which has produced satisfactory results are polydimethylsiloxane and the silicones which correspond to the following formula:

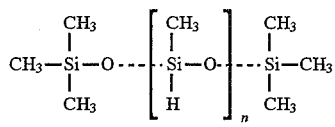

n being an integer equal to at least 5, without exceeding 200, for example equal to 40.

Particularly preferred silicones are those denoted by the general formula:

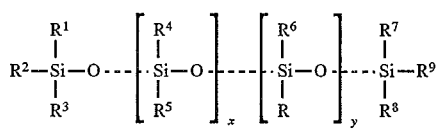

in which:

each of $R^1$, $R^2$, $R^3$, $R^4$, $R^5$, $R^6$, $R^7$, $R^8$ and $R^9$ denotes an alkyl radical R denotes a hydrocarbon radical containing at least one epoxy group or a tertiary amino group $x \geq 1$ and $y \geq 1$.

The values of x and y are a function of the viscosity of the silicone. In general x and y do not exceed 200.

Silicones which are preferably employed are such as defined above, in which the groups $R^1$, $R^2$, $R^3$, $R^4$, $R^5$, $R^6$, $R^7$, $R^8$ and $R^9$ are alkyl radicals containing up to 6 carbon atoms. Those especially advantageous are polydimethylsiloxane derivatives in which the groups $R^1$, $R^2$, $R^3$, $R^4$, $R^5$, $R^6$, $R^7$, $R^8$ and $R^9$ are methyl groups.

The silicone present in the composition according to the invention may be prepared, for example, by the method described in Patent EP-0,158,140.

Preferred silicones are those which exhibit a viscosity of at least 500 centistokes, in particular at least 1000 centistokes, values of at least 30,000 centistokes being the most advantageous ones, viscosities lower than or equal to 300,000,000 centistokes, preferably lower than or equal to 100,000,000 centistokes being, however, recommended. Values from 500 to 10,000,000 centistokes are especially preferred. Particularly satisfactory results are obtained with a silicone with a viscosity of 1000 to 2,000,000 centistokes. Viscosity is intended to denote the kinematic viscosity measured at 25° C.

The optimum quantity of silicone which is mixed with the olefin polymer in the composition according to the invention depends on the viscosity of the silicone and the intended gloss. In fact, the minimum quantity of a low-viscosity silicone required in order to obtain glossy surfaces while retaining good processing properties is greater than that needed in the case of a very viscous silicone. The quantity by weight of silicone which is used is generally greater than or equal to 0.08% of the weight of the olefin polymer, in particular equal to at least 0.2% by weight of the olefin polymer; it is usually lower than or equal to 20%, preferably lower than or equal to 10%, of this weight. Values from 0.08 to 10% by weight are especially recommended. Values which do not exceed 2% of the weight of the olefin polymer, for example 1%, are the most advantageous ones.

It is obvious that the composition according to the invention may include a single silicone or a mixture of silicones.

Besides the olefin polymer and the silicone, the composition according to the invention may also contain usual additives such as stabilizers (for example anti acids, antioxidants and/or UV stabilizers), organic or inorganic colorants (such as, for example, titanium or iron oxide) or antistatic agents. The content of these various additives is generally lower than 10 parts by weight per 100 parts by weight of olefin polymer.

The preparation of the composition according to the invention can be performed by any of the methods known to the art. A particularly simple operating method includes dry mixing of the different constituents in the desired proportions, for example in a mechanical mixer.

It is also possible to prepare, in a first step, a primary mixture, called a master batch, including a proportion of the olefin polymer, the silicone and, optionally, additives such as defined above, this master batch being rich in silicone. The silicone content in this master batch is generally betwen 0.05 and 50% by weight, preferably between 0.5 and 40% by weight, more particularly between 1 and 30% by weight, of the mixture. Mixtures including from 2 to 25% by weight of silicone are especially preferred. This master batch is then mixed with the remaining proportion of the olefin polymer during the manufacture of a manufactured object, in order then to obtain the composition according to the invention.

In the process just described the silicone may optionally be heated and mixed in the liquid state with the olefin polymer, which is generally in the form of a powder.

The proportions of the different constituents of the composition according to the invention may be optionally modified during the processing.

The composition according to the invention is suitable for processing in all the conventional processes for the manufacture of plastic objects and more particularly in the extrusion, blow-extrusion, extrusion-thermo forming and injection moulding processes. It is suitable for the manufacture of manufactured objects whose surface exhibits improved gloss, such as films, sheeting, sheets, receptacles, bags, pouches or pipes. Because of its nontoxic properties, the composition according to the invention is particularly suited for the manufacture of manufactured objects intended for the packaging of beverages and foodstuffs, such as receptacles, films and sheeting.

Consequently, the present invention also relates to the objects manufactured from the composition according to the invention, in particular those obtained by extrusion, blow-extrusion, extrusion-thermoforming or injection moulding, for example objects employed as food packaging.

An unexpected advantage of the manufactured objects according to the invention is their glossy surface. In addition, the manufactured objects according to the invention have a smooth surface which is free from optical imperfections and have a high whiteness value.

EXAMPLES

The examples whose description follows are used to illustrate the invention. In these examples, polyethylene-based compositions in accordance with the invention were prepared, from which flasks were then manufactured. The meaning of the symbols employed in these examples, the units expressing the quantities referred to and the methods for measuring these quantities are detailed below.

$M_w/M_n$=ratio of the weight-average molecular mass ($M_w$) of the polyethylene to the number-average molecular mass ($M_n$) of the polyethylene, measured by steric exclusion chromatography performed in 1,2,4-trichlorobenzene at 135° C. on a Waters company model 150 C chromatograph.

SD=standard density of the polyethylene, expressed in g/cm$^3$, measured according to ISO standard 1183 (1987).

MI=melt index of the polyethylene, expressed in g/10 min, measured at 190° C. under a 2.16 kg load according to ASTM standard D 1238 (1986).

Example 1 (in accordance with the invention)

A master batch was prepared in a rotary mixer (for approximately 7 min and at a speed of rotation of 720 rev/min) at ambient temperature, including:

- 94.87% by weight of polyethylene (containing 0.6% by weight of butene) exhibiting an $M_w/M_n$ of 10.4, an SD of 0.952 g/cm$^3$ and an MI of 0.6 g/10 min,
- 5% by weight of Baysilon®silicone,
- 0.04% by weight of stabilizer, [stearyl beta-(3,5-di-t-butyl-4-hydroxyphenyl)propionate],
- 0.04% by weight of stabilizer, [bis(2,4-di-t-butyl) pentaerythritol diphosphite],
- 0.05% by weight of stabilizer (hydrotalcite).

The master batch was then granulated in an extruder at 190° C. The granules thus obtained were mixed in a rotary mixer (for approximately 7 min and at a speed of rotation of 420 rev/min) at ambient temperature with the polyethylene defined above, so as to obtain a composition including 0.1% by weight of the silicone, and with the abovementioned stabilizers so as to maintain their concentration at 0.04% by weight, 0.04% by weight and 0.05% by weight respectively. One-litre flasks were then manufactured by blow-extrusion. It was found that these flasks had a glossy surface.

Example 2 (in accordance with the invention)

The operations of Example 1 were repeated with a polyethylene (containing 0.6% by weight of butene) exhibiting an $M_w/M_n$ of 6.8, an SD of 0.936 g/cm$^3$ and an MI of 0.6 g/10 min.

The flasks obtained exhibited a glossy surface.

What is claimed is:

1. A composition adapted to produce a manufactured object having a glossy surface and including at least one olefin polymer and at least one silicone present in an amount from 0.08 to 10% by weight based on the weight of the entire composition, the olefin polymer exhibiting a standard density of 0.930 to 0.970 grams/cm$^3$ and a molecular mass distribution defined by an $M_w/M_n$ ratio from 5 to 12.

2. The composition according to claim 1, wherein the olefin polymer is an ethylene homopolymer or copolymer.

3. The composition according to claim 1, wherein the olefin polymer exhibits a standard density of 0.935 to 0.955 g/cm$^3$.

4. The composition according to claim 1, wherein the silicone exhibits a viscosity of 500 to 300,000,000 cSt.

5. The composition according to claim 1, wherein the silicone corresponds to the formula

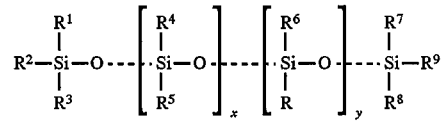

in which each of $R^1$, $R^2$, $R^3$, $R^4$, $R^5$, $R^6$, $R^7$, $R^8$ and $R^9$ denotes an alkyl radical, and R denotes a hydrocarbon radical containing at least one epoxy group or a tertiary amino group $x \geq 1$ and $y \geq 1$.

6. The composition according to claim 5, wherein the alkyl groups $R^1$, $R^2$, $R^3$, $R^4$, $R^5$, $R^6$, $R^7$, $R^8$ and $R^9$ are methyl groups.

7. A manufactured object having a glossy surface obtained from the composition in accordance with claim 1.

8. The object according to claim 7, obtained by extrusion, blow-extrusion, extrusion-thermoforming or injection moulding.

9. The composition according to claim 1, wherein said at least one silicone is present in an amount of not more than 2% by weight.

10. The composition according to claim 1, wherein said at least one silicone is present in an amount of not more than 1% by weight.

11. In a process for manufacturing an object having a glossy surface, the improvement comprising processing a composition according to claim 1.

* * * * *